(12) United States Patent
Zimmer et al.

(10) Patent No.: US 9,158,920 B2
(45) Date of Patent: Oct. 13, 2015

(54) SYSTEM AND METHOD FOR OUT-OF-BAND ASSISTED BIOMETRIC SECURE BOOT

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 1860 days.

(21) Appl. No.: 11/770,464

(22) Filed: Jun. 28, 2007

(65) Prior Publication Data

US 2009/0006859 A1 Jan. 1, 2009

(51) Int. Cl.
  *H04L 29/06* (2006.01)
  *G06F 21/57* (2013.01)

(52) U.S. Cl.
  CPC .................... *G06F 21/575* (2013.01)

(58) Field of Classification Search
  CPC ............ G06F 12/0817; G06F 12/6254; G06F 12/6272; G06F 21/00; G06K 9/00006; G07C 9/00158
  USPC ........ 726/2–7, 14, 17, 19, 21, 26–30; 725/19, 725/37; 713/1–2, 161, 168, 170, 177, 180, 713/182–186; 705/67, 72–73, 18; 709/212–219, 225, 229; 711/100, 711/102–105, 147–149, 163–164
  See application file for complete search history.

(56) References Cited

U.S. PATENT DOCUMENTS

| | | | | |
|---|---|---|---|---|
| 5,355,414 | A * | 10/1994 | Hale et al. ........................ | 726/34 |
| 5,402,492 | A * | 3/1995 | Goodman et al. ............... | 726/20 |
| 5,586,301 | A * | 12/1996 | Fisherman et al. ........... | 711/152 |
| 6,292,890 | B1 * | 9/2001 | Crisan ............................... | 713/2 |
| 7,310,042 | B2 * | 12/2007 | Seifert ......................... | 340/5.53 |
| 7,337,323 | B2 * | 2/2008 | Cochran et al. ............... | 713/182 |
| 7,461,249 | B1 * | 12/2008 | Pearson et al. ................ | 713/156 |
| 7,484,095 | B2 * | 1/2009 | de Jong ......................... | 713/170 |
| 7,500,093 | B2 * | 3/2009 | Makita .............................. | 713/2 |
| 7,504,942 | B2 * | 3/2009 | Marman ....................... | 340/541 |
| 7,711,152 | B1 * | 5/2010 | Davida et al. ................. | 382/115 |
| 7,769,207 | B2 * | 8/2010 | Olivo et al. ................... | 382/115 |
| 7,917,741 | B2 * | 3/2011 | Dutton et al. ..................... | 713/1 |
| 2003/0012415 | A1 | 1/2003 | Cossel | |
| 2004/0064453 | A1 * | 4/2004 | Ruiz et al. ......................... | 707/9 |
| 2005/0039013 | A1 | 2/2005 | Bajikar et al. | |
| 2006/0074986 | A1 * | 4/2006 | Mallalieu et al. .......... | 707/104.1 |
| 2006/0123240 | A1 | 6/2006 | Chaiken | |
| 2007/0143851 | A1 * | 6/2007 | Nicodemus et al. ............. | 726/25 |

FOREIGN PATENT DOCUMENTS

FR 2867578 9/2005

OTHER PUBLICATIONS

Extended European Search Report for European Patent Application No. 08251198.1, mailed Nov. 16, 2011, 6 pages.

* cited by examiner

*Primary Examiner* — Joseph P Hirl
*Assistant Examiner* — Leynna Truvan
(74) *Attorney, Agent, or Firm* — Trop, Pruner & Hu, P.C.

(57) ABSTRACT

In some embodiments, the invention involves using a dedicated service processor with out-of-band capabilities to enable a secure boot using biometric data to authenticate the user. In some embodiments, at least a secondary token is used enhance the secure boot. An off-line database may be accessed by the service processor during boot to store or retrieve biometric templates to compare with scanned, live, biometric data. Other embodiments are described and claimed.

6 Claims, 4 Drawing Sheets

SYSTEM AND METHOD FOR OUT-OF-BAND ASSISTED BIOMETRIC SECURE BOOT

FIELD OF THE INVENTION

An embodiment of the present invention relates generally to booting a computing device and, more specifically, to using a dedicated service processor with out-of-band capabilities to enable a secure boot using biometric data to authenticate the user.

BACKGROUND INFORMATION

Various mechanisms exist for authenticating users on log-in to a computing device. Biometric data may be used to authenticate a user. However, booting the computing device still poses significant risks. Existing systems may not utilize data on management consoles or remote servers during boot because the host processor typically cannot communicate remotely until the system has booted, and the operating system has been launched. Various mechanisms may be used to spoof the authentication systems during boot, thereby making authentication of biometric data at log-in suspect.

BRIEF DESCRIPTION OF THE DRAWINGS

The features and advantages of the present invention will become apparent from the following detailed description of the present invention in which.

DETAILED DESCRIPTION

An embodiment of the present invention is a system and method relating to using a service processor with out-of-band capabilities to assist in biometric data authentication during boot. In at least one embodiment, the present invention is intended to provide a secure boot environment using biometric data of a user.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Authenticating a user at boot time is highly desirable. Waiting until log-in time may allow tampering with various components of the platform. It may be possible to use an extensible firmware interface (EFI) USB driver to authenticate biometric data during the pre-operating system (pre-OS) stage of booting. However, these methods are very crude and the biometric vendor's code cannot be isolated from other option-ROM code, BIOS code or other pre-boot modules. There is also no protected memory with this sort of scheme. Updating biometric templates from a secure off-line database requires network access, which is not available by the host processor during the pre-OS stage. Pushing privacy sensitive and security sensitive processing into a separate microcontroller of manageability engine solves these problems. Scanned biometrics from a user attempting to boot a platform must be compared with authenticated biometric data (or templates) in a database. Utilizing a microcontroller with out-of-band communication capabilities allows these templates to be stored off-line rather than using all available local flash storage.

Figure 1:
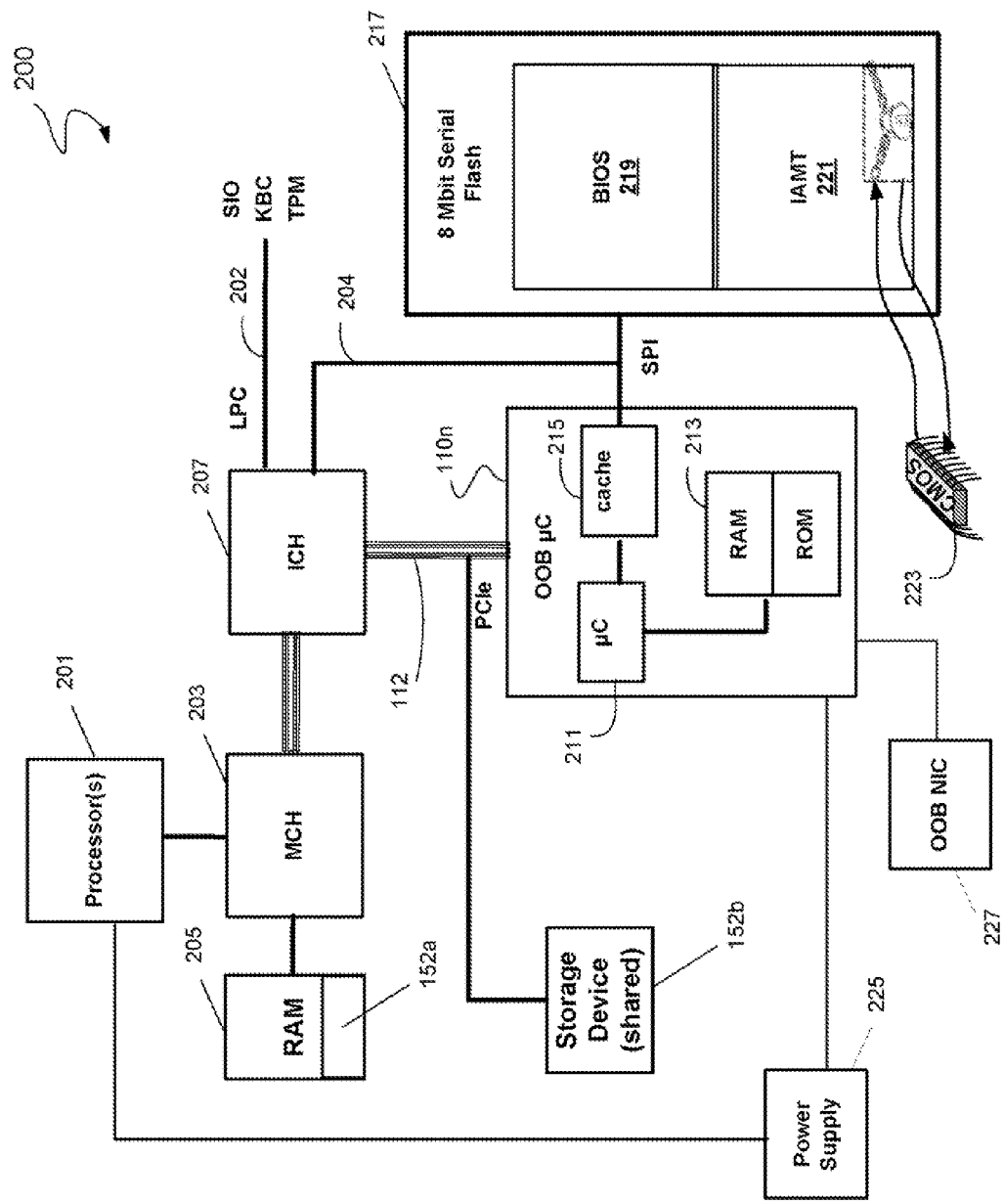
FIG. 1 is a block diagram illustrating features of an out-of-band microcontroller (OOB microcontroller), according to an embodiment of the environment.

FIG. 1 is a block diagram illustrating features of an out-of-band microcontroller (OOB microcontroller), according to an embodiment of the environment. A platform 200 comprises a processor 201. The processor 201 may be connected to random access memory 205 via a memory controller hub 203. Processor 201 may be any type of processor capable of executing software, such as a microprocessor, digital signal processor, microcontroller, or the like. Though FIG. 1 shows only one such processor 201, there may be one or more processors in the platform 200 and one or more of the processors may include multiple threads, multiple cores, or the like.

The processor 201 may be further connected to I/O devices via an input/output controller hub (ICH) 207. The ICH may be coupled to various devices, such as a super I/O controller (SIO), keyboard controller (KBC), or trusted platform module (TPM) via a low pin count (LPC) bus 202. The SIO, for instance, may have access to floppy drives or industry standard architecture (ISA) devices. In an embodiment, the ICH is coupled to non-volatile memory via a serial peripheral interface (SPI) bus 204. The non-volatile memory may be flash memory or static random access memory (SRAM), or the like. An out-of-band (OOB) microcontroller 110n may be present on the platform 200. The 00B microcontroller 110n may connect to the ICH via a bus 112, typically a peripheral component interconnect (PCI) or PCI express bus. The OOB microcontroller may also be coupled with the non-volatile memory store (NV store) 217 via the SPI bus 204. The NV store 217 may be flash memory or static RAM (SRAM), or the like. In many existing systems, the NV store is flash memory.

The OOB microcontroller 110n may be likened to a "miniature" processor. Like a full capability processor, the OOB microcontroller has a processor unit 211 which may be operatively coupled to a cache memory 215, as well as RAM and ROM memory 213. The OOB microcontroller may have a built-in network interface 227 and independent connection to a power supply 225 to enable out-of-band communication even when the in-band processor 201 is not active.

In embodiments, the processor has a basic input output system (BIOS) 219 in the NV store 217. In other embodiments, the processor boots from a remote device (not shown) and the boot vector (pointer) resides in the BIOS portion 219 of the NV store 217. The OOB microcontroller 110n may have access to all of the contents of the NV store 217, including the BIOS portion 219 and a protected portion 221 of the non-volatile memory. In some embodiments, the protected portion 221 of memory may be secured with Intel® Active Management Technology (iAMT). In an embodiment, the portion 221 of the NV store is protected from access by the firmware based on chipset selections in a base address register (BAR). More information about iAMT may be found on the public Internet at URL www*intel*com/technology/manage/iamt/. (Note that periods have been replaced with asterisks in URLs contained within this document in order to avoid inadvertent hyperlinks).

Since the BIOS portion 219 of non-volatile memory may be modified by the OS or applications running within the OS, it is vulnerable to malicious tampering. The protected area of memory 221, available only to the OOB microcontroller, may be used to store critical boot vector or biometric information without risk of tampering. The only way to access the OOB microcontroller side of the NV store 217 is through verification via a proxy through the OOB microcontroller, i.e., signature authentication or the like. Embodiments of the present invention utilize a hardware protected region 221 of the non-volatile memory 117 and make the protected region inaccessible to the OS.

Many existing systems use the extensible firmware interface (EFI) and its associated flash variables. The EFI is a specification which defines a new model for the interface between operating systems and platform firmware, commonly known as Basic Input Output System (BIOS). The specification version 1.10, published Dec. 1, 2002, is available on the public Internet at URL www*intel*com/technology/efi/main_specification.htm. In the EFI boot location specification, instead of wholly depending on pointers to a single boot location, a series of boot variables are used. The boot variables specify from which location the platform should boot. EFI systems store the boot variables in non-volatile memory, typically flash memory. This standard architecture is convenient for implementing embodiments of the present invention because the location of the boot variables is well defined. The EFI system may also store biometric templates or authentication policies in the protected non-volatile memory.

Using EFI, the platform may have boot variables and a boot order list. For instance, the boot, order may dictate that a floppy drive (A:\) is booted from first. The policy may dictate that a hard drive is booted from next, a CD is booted from next, etc. The boot order list may include network targets for boot. In some existing systems, an application may write over a boot variable. Some legacy systems not using the EFI architecture store boot information in CMOS 223, using proprietary formats. Embodiments of the present invention utilize a hardware protected region 221 of the non-volatile memory 217 and make the protected region inaccessible to the OS. The OOB microcontroller 110n controls this protected portion of the non-volatile memory 217. Thus, the firmware (BIOS) cannot access the protected portion 221. Further, applications running under the OS cannot directly communicate with the OOB microcontroller. Therefore, these applications have no access to the protected portion 221.

The OOB microcontroller can promote certain settings to its own protected NV store 221. In other words, the OOB microcontroller may heuristically select which good hoot information to store in case a need should arise to replace the current boot information. The OOB microcontroller may retrieve information from the BIOS side 219 of the non-volatile memory 217. In embodiments, the OOB microcontroller may determine the last known good boot settings and store them in the protected portion 221. In some embodiments, the OOB microcontroller may directly replace the boot settings in the BIOS portion 219 of the NV store 217. Heuristics may be used to identify what the last known good setting is.

In an embodiment, implementation of "mailboxes" to pass messages and data between the in-band (host processor communication) and out-of-band processor is according to techniques discussed in U.S. patent application Ser. No. 10/964,355, entitled "BUS COMMUNICATION EMULATION" to Rothman et al. and filed on Oct. 12, 2004.

The OOB microcontroller 110n may be operated to store a "message" containing a directive in a memory shared by the OOB microcontroller 110n and a processor of the computer system such as the processor 201 of the host computer 200. In the illustrated embodiment, the host computer 200 includes a shared memory 152 which is accessible by both the processor 201 and the OOB microcontroller 110n. The shared memory 152 may reside in a reserved area of RAM 152a, or be located in a separate non-volatile memory store 152b, or the like. The shared memory may be operated as a mailbox for these messages. Thus, in one aspect, the OOB microcontroller 110n may store a message in the shared memory 152 or retrieve a message from the shared memory 152, independently of the status of the host computer 200 including the status of the processor 201, the operating system and the programs. Thus, in the illustrated embodiment, the OOB microcontroller 110n may store or retrieve messages in the shared memory 152 whether the Processor 201 is being initialized or is turned off, or whether the operating system is booting, running, crashed or otherwise.

To facilitate such independent operation, in this example, the controller 110n, the shared memory 152, the local bus 112 and other components as appropriate may be powered independently of the main components of the host computer 200 including the processor 201 and the host memory 205. The shared memory 152 may be non-volatile (NV) memory such as flash memory or static random access memory (SRAM). In embodiments described in more detail below, the OOB microcontroller 110n operates independently of the operating system or system start-up program, such that the OOB microcontroller 110n may have its own dedicated control circuitry, firmware, operating system, etc. to control the operations of the OOB microcontroller 110n independently of the status of the remainder of the host computer 200. It is appreciated that the degree of operational independence, if any, of the controller 110n and other components may vary, depending upon the particular application.

An embodiment of the invention enables a secure boot using authenticated biometric data by utilizing a microcontroller separate from the host processor on the platform. The microcontroller may have active management technology (AMT) capabilities, such as Intel® Active Management Technology (iAMT) capabilities, as well as having out-of-band (OOB) communication capabilities, hereinafter referred to as an out-of-band (OOB) microcontroller, or also interchangeably referred to as a manageability engine (ME) controller or iAMT. Intel® Active Management Technology (iAMT). By utilizing the OOB capabilities of the microcontroller biometric data of a user may be authenticated during early boot time, rather than waiting for the operating system to launch and authenticating during log-in, only.

Figure 2:
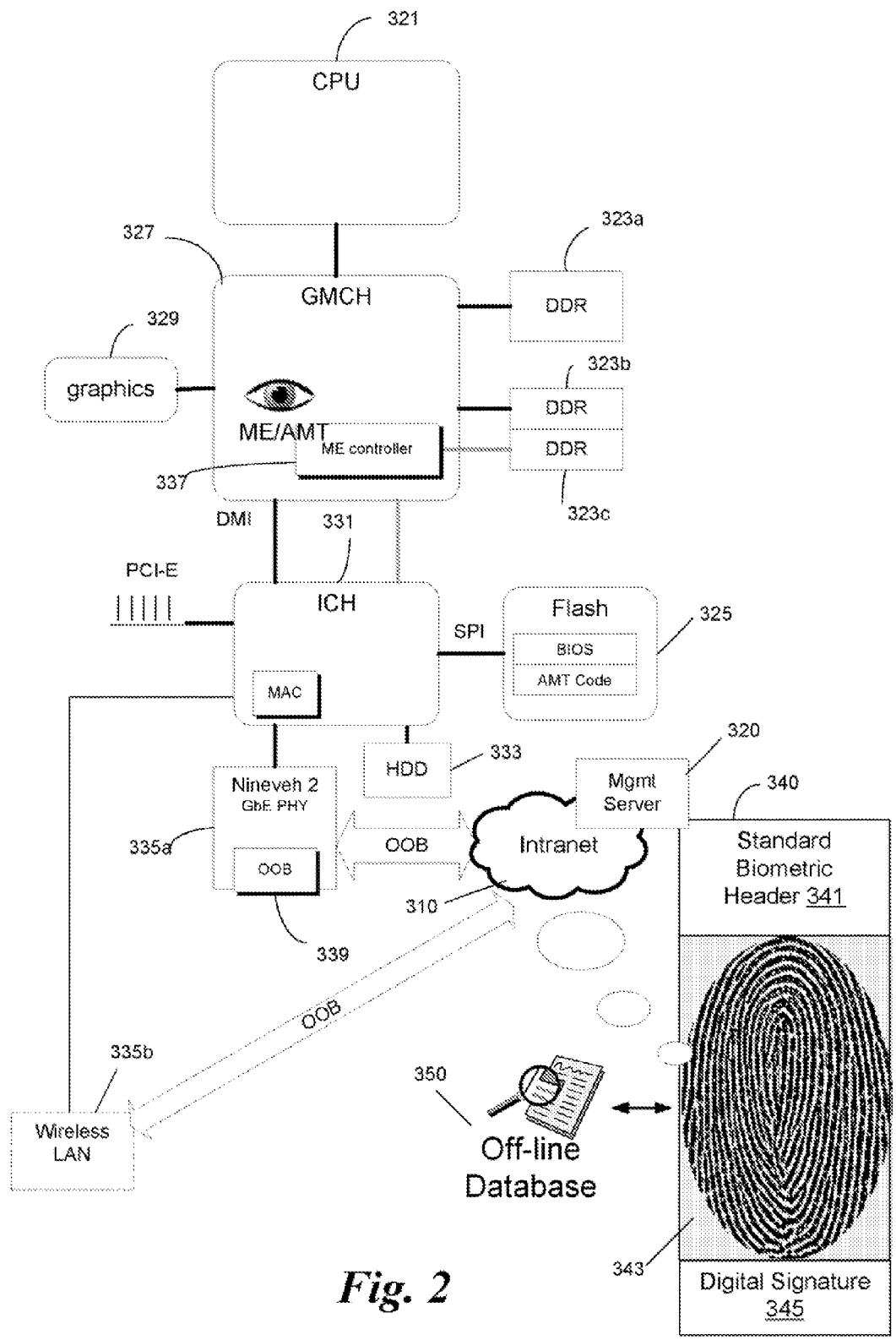
FIG. 2 is a block diagram of an exemplary client platform accessing biometric data from a network, according to embodiments of the invention.

FIG. 2 illustrates an exemplary client platform, according to embodiments of the invention. In an exemplary client embodiment, the platform comprises a processor 321. The processor 321 is communicatively coupled to double data rate (DDR) memory 323a-c via a graphics memory controller hub (GMCH), or north bridge 327. Other memory types may be used. DDR 323c may be hardware isolated from other memory, such that only the ME controller 337 has access to the isolated memory portion. The GMCH 327 may have a graphics controller integrated and communicate to a graphics interface 329 and an ICH 331. The ICH 331 may communicate with a hard disk drive (HDD) 333, flash memory 325 and one or more network interface devices 335, for instance the Ninevah 2 Ethernet controller 335a or, optionally, the Kedron wireless LAN adapter 335b, both available from Intel Corp. The network devices 335 may have an out-of-band (OOB) communications component 339. In this embodiment, the ME subsystem 337 may be built into the GMCH 327. Other embodiments may have an ME subsystem 337 integrated with an ICH or a discrete baseboard management controller (BMC). The flash memory 325 comprises the firmware code (BIOS), protected AMT code and manufacturer settings. It will be apparent to one of skill in the art that processor 321 may comprise single or multi-processors and/or may have more than one core.

The embodiment shown in FIG. 2 utilizes a manageability engine (ME) 337 to store and retrieve biometric information 340 with a standard biometric header 341, biometric data 343, and digital signature 345. The biometric data may be retrieved from a management server 320 on an intranet 310 by the ME controller 337 via the OOB communication mechanism 339. Biometric information may be stored in an off-line database 350. Biometric data may be stored in what is called a "Template," in the off-line database. Some biometric may be stored locally in protected memory, for instance flash 325. However, flash memory 325 is limited, so off-line databases are a better option for storing large amounts of biometric information. Since the OS and other applications have no access to the protected portion of the flash 325 (FIG. 1, 221), stored biometric data may be protected from tampering.

It will be understood that additional security is attainable by providing an additional level of security to the biometric data. As gruesome as it may be, a finger or eyeball may be stolen from an authorized user to gain entry into biometric-only security systems. Thus, it is advantageous to combine the use of biometrics with passcodes, smartcards or RFID device, or other secondary and tertiary schemes, i.e., "who you are", "what you know" and "what you have."

In an embodiment, a fingerprint may be used as the biometric. There are standard protocols used for transporting a fingerprint token that may be employed. More information about standards for biometric data may be found at www*bioapi*org/Version_1.1_Description.asp. For instance, the BioAPI Specification provides a high-level generic biometric authentication model, one suited for any form of biometric technology. It covers the basic functions of enrollment, verification, and identification, and includes a database interface to allow a biometric service provider (BSP) to manage the identification population for optimum performance. The specification also provides primitives that allow the application to manage the capture of samples on a client, and the enrollment, verification, and identification on a server. It will be understood that the BioAPI Specification may be used to define the biometric information that is passed to the ME, or AMT microcontroller, in embodiments of the invention.

This BioAPI specification defines the Application Programming Interface (API) and Service Provider Interface for a standard biometric technology interface. Definition for security requirements for biometric applications and service providers is beyond the scope of this specification.

In an embodiment, biometric authentication may be performed during the pre-boot stage of driver execution environment (DXE), using a DXE driver. For EFI systems, the DXE phase occurs after preEFI initialization (PEI), but before the boot drive select (BDS) phase, and before the boot driver or OS is launched.

Figure 3:
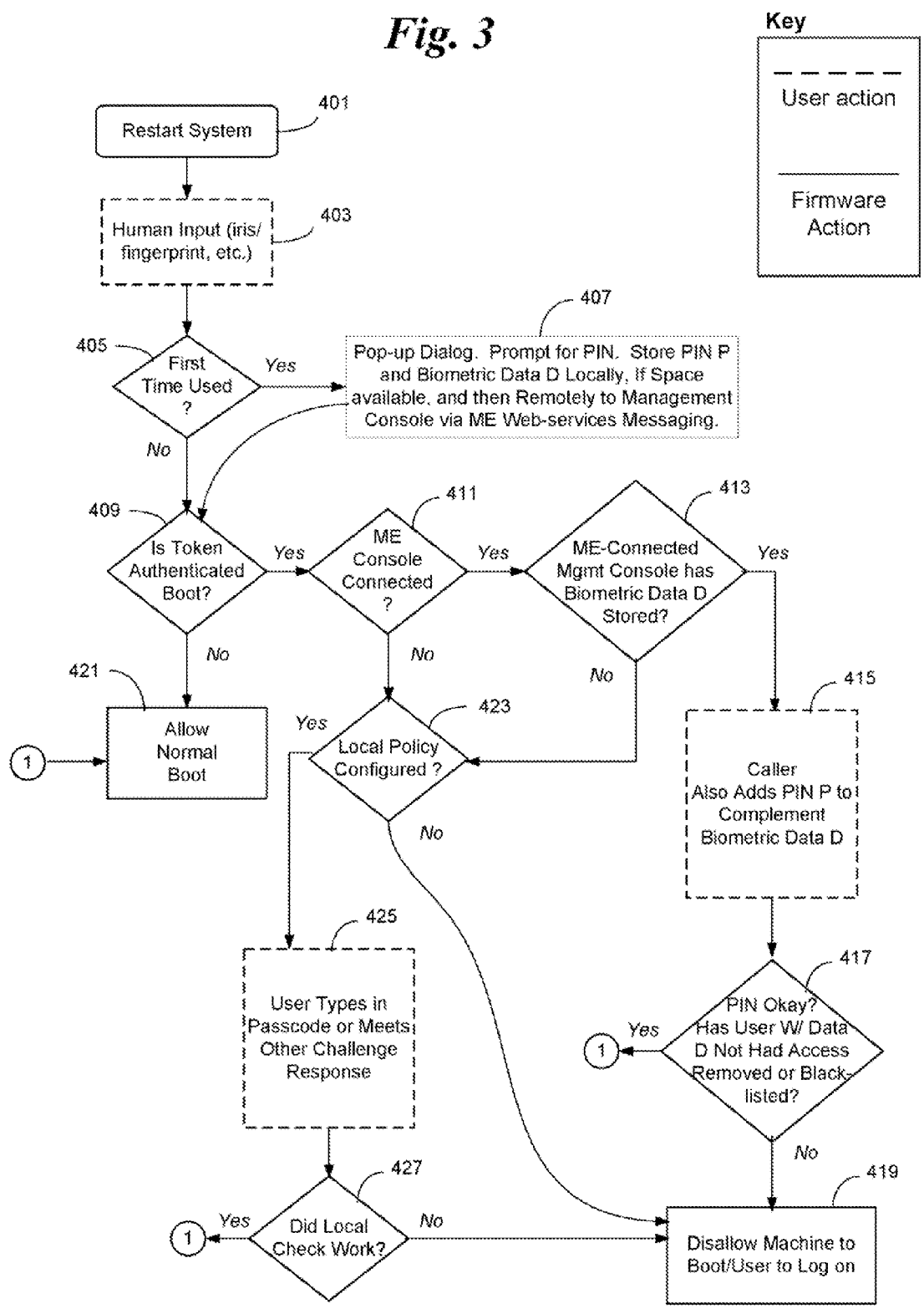
FIG. 3 is a flow diagram illustrating an exemplary method for authenticating biometric data for a secure boot, according to embodiments of the invention.

FIG. 3 is a flow diagram illustrating an exemplary method for authenticating biometric data for a secure boot, according to embodiments of the invention. When a system is restarted, or rebooted, by a user in block 401, a mechanism to collect the user's biometric data is initiated in block 403. There are various methods known in the art to collect fingerprints, retinal or iris scans, and other personally identifying information. It will be understood that various platforms may use different biometric data, or multiple types.

If this is the first time the biometric data is to be entered, as indicated in decision block 405, then a pop-up dialog or prompt screen may appear to ask the user to provide a personal identification number (PIN), in block 407. The PIN may be stored and biometric data collected and stored, locally. The PIN may also be sent to a remote management console via the ME out-of-band messaging.

If a token authenticated boot is enabled, as indicated in block 409, then a determination is made as to whether a ME console is connected, in block 411. If so, then a determination is made as to whether the ME console has stored biometric data, in block 413. If so, a PIN may be entered to complement the biometric data, in block 415. If the PIN is authenticated, as determined in block 417, a determination is made as to whether the user's access has been removed or blacklisted. The entered biometric data is compared to a template from the off-line database, or optionally, local protected memory. If the comparison fails, or the user access is removed or blacklisted, the platform is not allowed to boot, in block 419. Otherwise, the platform is allowed to boot normally, in block 421. Similarly, if biometric secure booting is disabled, as determined in block 409, the platform will be allowed to boot normally in block 421.

If the ME console is not connected, or if the console does not have biometric data stored, a determination may be made as to whether a local policy is configured, in block 423. If no local policy is configured, the platform is not allowed to boot, in block 419. Otherwise, the user may enter a passcode or meet another challenged response to provide authentication according to the local policy, in block 425. If the local policy criteria are met, as determined in block 427, the platform is allowed to boot normally, in block 421. Otherwise, the platform is not allowed to boot, in block 419.

Figure 4:
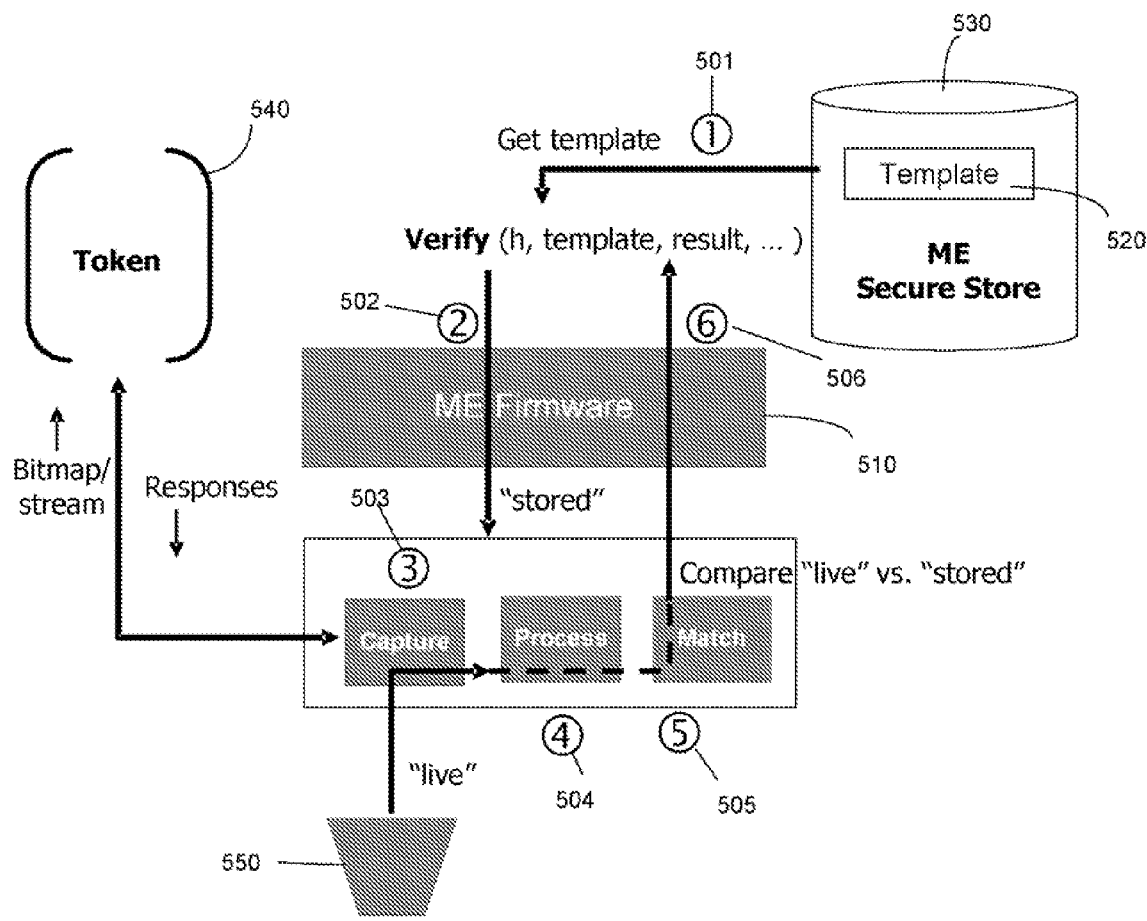
FIG. 4 is a block diagram illustrating actions performed by the manageability engine (ME) to effect a secure boot, according to an embodiment of the invention.

FIG. 4 is a block diagram illustrating actions performed by the ME to effect a secure boot, according to an embodiment of the invention. The ME 510 may retrieve a template 520 from the secure storage 530, at 501. The template is verified by the ME at 502. A token (i.e., passcode, challenged response, etc.) 540 from a user may be captured at 503. A "live" biometric scan 550 is captured at 503, as well. The token 540 and biometric data 550 are processed at 504 and then matched to the template 520 at 505. The result of the match may be returned in the verify function at 506. The result may be returned as a probability that the user matches the template, or may be a binary (true/false) response. Platform policy may define a probability threshold, below which, the platform will not be allowed to boot.

In another embodiment, a transport layer security (TLS) session may be set up between the ME 110 and a remote information technology (IT) console (not shown). The templates may be stored at the remote console to relieve the ME secure store 530 of the burden of storing large amounts of biometric data, and to maintain the integrity of the data.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system, comprising:
   a host processor on a platform having memory and communicatively coupled to non-volatile memory storing a basic input/output system;
   a secondary processor coupled to the platform and coupled to a network interface controller enabling out-of-band communication and communicatively coupled to a secure portion of said non-volatile memory, the secure portion of non-volatile memory being inaccessible to the host processor, said secondary processor to boot before said host processor boots; and
   said secondary processor having an operating system different than said host processor to securely communicate with a remote database to authenticate a user based on biometric information obtained from the user, by sending said biometric information over said network interface controller to a remote authority for comparison to biometric data stored remotely from said system, said secondary processor powered independently from said host processor.

2. The system as recited in claim 1, further comprising at least one biometric reader to scan biometric information from the user during pre-boot.

3. The system as recited in claim 2, further comprising:
   means to retrieve at least a secondary token from the user to be used with the live biometric data to authenticate the user before a boot of the host processor.

4. The system as recited in claim 3, wherein the secondary token is one of passcode or response to a challenge.

5. The system as recited in claim 4, further comprising logic to determine whether a user enters a valid token and to determine whether the user possesses a required physical security item.

6. The system as recited in claim 5, wherein the physical security item is one of smartcard, key fob, RFID device and other identifiable physical items.

* * * * *